(12) United States Patent
Mizutani et al.

(10) Patent No.: US 8,077,156 B2
(45) Date of Patent: Dec. 13, 2011

(54) APPARATUS, METHOD AND COMPUTER PROGRAM PRODUCT FOR USING MULTI-TOUCH TO TRANSFER DIFFERENT LEVELS OF INFORMATION

(75) Inventors: Michihito Mizutani, Helsinki (FI); Jussi Severi Uusitalo, Hameenlinna (FI)

(73) Assignee: Nokia Corporation, Espoo (FI)

( * ) Notice: Subject to any disclaimer, the term of this patent is extended or adjusted under 35 U.S.C. 154(b) by 1014 days.

(21) Appl. No.: 11/955,807

(22) Filed: Dec. 13, 2007

(65) Prior Publication Data
US 2009/0153493 A1 Jun. 18, 2009

(51) Int. Cl.
*G06F 3/041* (2006.01)
(52) U.S. Cl. .................. 345/173; 178/18.01; 463/30
(58) Field of Classification Search .......... 345/156–157, 345/173; 715/701–703; 463/36, 30; 178/18.01
See application file for complete search history.

(56) References Cited

U.S. PATENT DOCUMENTS

| | | | |
|---|---|---|---|
| 5,989,099 A * | 11/1999 | Arnold et al. | 446/487 |
| 6,422,941 B1 * | 7/2002 | Thorner et al. | 463/30 |
| 7,432,912 B2 * | 10/2008 | Cote et al. | 345/169 |
| 7,812,820 B2 * | 10/2010 | Schuler et al. | 345/163 |

* cited by examiner

*Primary Examiner* — Abbas Abdulselam
(74) *Attorney, Agent, or Firm* — Alston & Bird LLP

(57) ABSTRACT

An apparatus, method and computer program product are provided for differentiating between and transmitting different levels of information associated with an object or file depending upon a number of tactile inputs detected. In particular, a user can define a number of levels (e.g., of privacy, of detail, etc.) associated with items of information making up objects or files stored on his or her device. The user can then indicate which level of information (i.e., which items of information of the object or file) he or she would like to transmit by using a different number of fingers (or other selection devices) to select the object or file. The electronic device may, in response, determine the number of fingers (or other selection devices) used and then transmit only the corresponding portions (e.g., items of information) of the selected object or file.

25 Claims, 4 Drawing Sheets

APPARATUS, METHOD AND COMPUTER PROGRAM PRODUCT FOR USING MULTI-TOUCH TO TRANSFER DIFFERENT LEVELS OF INFORMATION

FIELD

Embodiments of the invention relate, generally, to the transferring of information and, in particular, to the use of a multi-touch touchscreen to transfer different levels of information.

BACKGROUND

Physical copies of pictures, videos, letters and other documents, presentations and even business cards are becoming a thing of the past. More and more, people are maintaining electronic copies of all of the items of interest to them on their electronic devices (e.g., cellular telephones, personal computers (PCs), laptops, personal digital assistants (PDAs), pagers, etc.) and then sharing these electronic copies, rather than the actual physical copies, with their friends, family members, loved-ones and colleagues.

In some instances a user may desire to share different versions of the various items of interest depending upon the level of familiarity with the person(s) to whom the item is being transmitted, the capabilities of the device used to receive the electronic copy of the item of interest, and/or other factors. For example, a user may wish to share only items of interest that he or she feels are public with certain individuals, while sharing more private items of interest with others. Similarly, a user may wish to share a digital image or video with individuals whose devices have varying capabilities with respect to receiving and rendering the digital image or video. The user may, therefore, need to tailor the image or video to the capabilities of the recipient's device.

A need, therefore, exists for a means by which a user can quickly, easily and automatically transmit different versions of the items of interest (e.g., pictures, videos, text documents, multimedia presentations, electronic/virtual business cards, etc.) he or she has stored on his or her electronic device to other electronic devices.

BRIEF SUMMARY

In general, embodiments of the present invention provide an improvement by, among other things, providing a technique for differentiating between different levels of information when transmitting objects or files from one electronic device to another. In particular, according to one embodiment, a user can indicate which portion(s) (e.g., items of information) of an object or file (e.g., text message, multimedia message, text, audio and/or video file, etc.) he or she would like to transmit by using a different number of fingers (or other selection objects) to select the object or file to be transmitted, or to otherwise touch the electronic device touchscreen. The electronic device may, in response, determine the number of fingers (or other selection objects) used and then transmit only the corresponding portions (e.g., items of information) of the object or file.

In accordance with one aspect, an apparatus is provided for selecting different levels of information depending upon the number of tactile inputs detected. In one embodiment, the apparatus may include a processor configured to: (1) receive a request associated with an object comprising one or more items of information; (2) detect one or more tactile inputs on a touchscreen; (3) determine the number of tactile inputs detected; and (4) select at least one of the one or more items of information associated with the object based at least in part on the number of tactile inputs detected.

In accordance with another aspect, a method is provided for selecting different levels of information depending upon the number of tactile inputs detected. In one embodiment, the method may include: (1) receiving a request associated with an object comprising one or more items of information; (2) detecting one or more tactile inputs on a touchscreen; (3) determining the number of tactile inputs detected; and (4) selecting at least one of the one or more items of information associated with the object based at least in part on the number of tactile inputs detected.

In accordance with yet another aspect, a computer program product is provided for selecting different levels of information depending upon the number of tactile inputs detected. The computer program product contains at least one computer-readable storage medium having computer-readable program code portions stored therein. The computer-readable program code portions of one embodiment include: (1) a first executable portion for receiving a request associated with an object comprising one or more items of information; (2) a second executable portion for detecting one or more tactile inputs on a touchscreen; (3) a third executable portion for determining the number of tactile inputs detected; and (4) a fourth executable portion for selecting at least one of the one or more items of information associated with the object based at least in part on the number of tactile inputs detected.

According to aspect, an apparatus is provided for selecting different levels of information depending upon the number of tactile inputs detected. In one embodiment, the apparatus may include: (1) means for receiving a request associated with an object comprising one or more items of information; (2) means for detecting one or more tactile inputs on a touchscreen; (3) means for determining the number of tactile inputs detected; and (4) means for selecting at least one of the one or more items of information associated with the object based at least in part on the number of tactile inputs detected.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
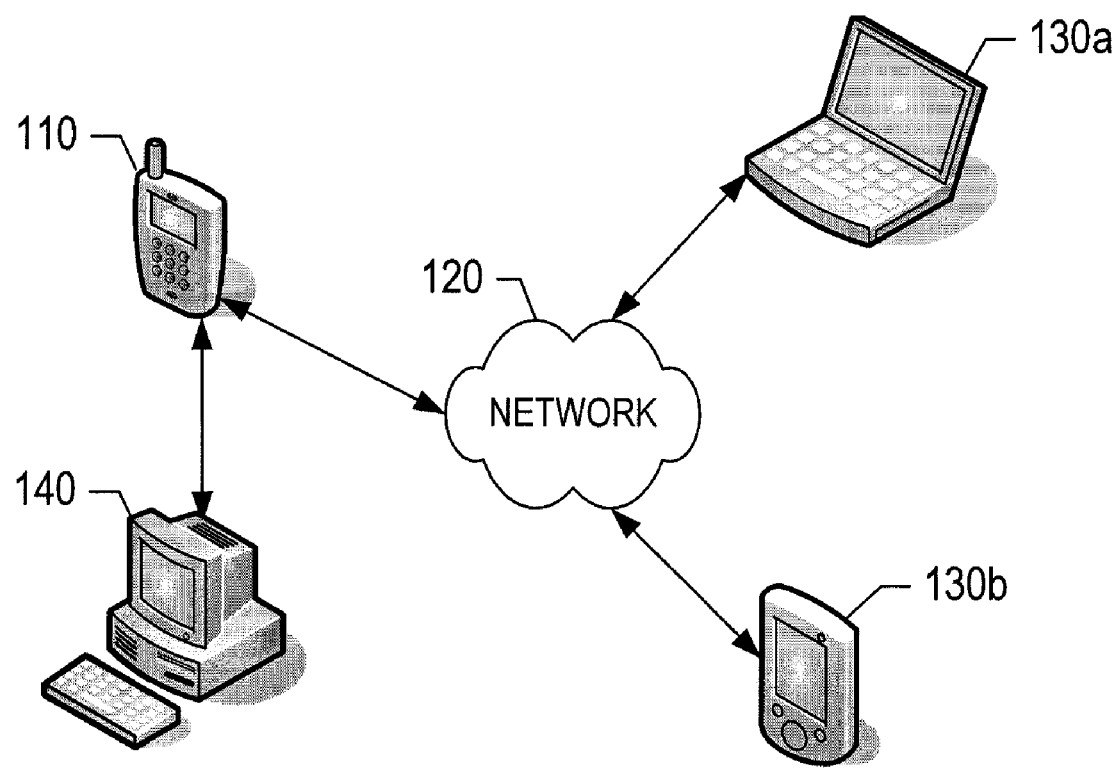
FIG. 1 is a block diagram of one type of system that would benefit from embodiments of the present invention.

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein;

rather, these embodiments are provided so that this disclosure will satisfy applicable legal requirements. Like numbers refer to like elements throughout.

Overview:

In general, embodiments of the present invention provide an apparatus, method and computer program product for differentiating between different levels of information when transmitting objects or files from one electronic device to another. In particular, according to one embodiment, a user may define one or more levels (e.g., of privacy, of detail, etc.) to be associated with various objects or files (e.g., text messages, multimedia messages, text, audio and/or video files, etc), wherein each object or file includes a number of items of information associated with it. The user may then specify which items of information of the object or file correspond to each level. When the user wishes to transmit a portion, or all, of the object or file to another electronic device, the user may select the object or file, or otherwise touch the electronic device touchscreen, with the number of fingers (or other selection objects including, for example, styluses, pens, pencils, etc.) corresponding to the desired level of information to be transmitted.

To illustrate, as is discussed in more detail below, where, for example, the object or file comprises an electronic/virtual business card (or "v-card"), the items of information making up the object or file may include data fields associated with the user's name, phone number, address and/or email address, an image of the user, his or her spouse, children, or the like. The user may define one or more levels of privacy to be associated with the items of information included in the electronic/virtual business card. For example, the user may designate certain items of information (e.g., the user's name and phone number) as public, while designating other items of information of the electronic/virtual business card (e.g., his or her address and/or image) as semi-public, semi-private or private. When the user wishes to transmit only the "public" items of information, he or she may select the electronic/virtual business card, or otherwise touch the electronic device touchscreen, with only one finger (stylus, pen, pencil, or other selection object). Alternatively, where, for example, the user wishes to provide more private information (e.g., his or her address and/or image), he or she may select the electronic/virtual business card, or otherwise touch the electronic device touchscreen, with two fingers (or other selection objects). The electronic device may determine the number of fingers (or other selection objects) used and then transmit the corresponding items of information.

Overall System and Mobile Device:

Referring to FIG. 1, an illustration of one type of system that would benefit from embodiments of the present invention is provided. As shown in FIG. 1, the system may include an electronic device 110 (e.g., cellular telephone, personal computer (PC), laptop, personal digital assistant (PDA), pager, etc.), referred to hereinafter as the "source device," in communication with one or more "target" electronic devices 130a, 130b (e.g., cellular telephones, PCs, laptops, PDA, pagers, etc.) over a communication network 120 for the purpose of transmitting and receiving objects or files, such as text messages, multimedia messages, text, audio and/or video files, electronic/virtual business cards, and the like.

The communication network 120 may comprise any wired or wireless network including, for example, a wired or wireless personal area network (PAN), metropolitan area network (MAN), local area network (LAN), wide area network (WAN), or the like. In this regard, the communication network 120 may be capable of supporting communication in accordance with any one or more of a number of first-generation (1G), second-generation (2G), 2.5G and/or third-generation (3G) mobile communication protocols or the like. More particularly, the source and target devices 110, 130a, 130b may be coupled to one or more networks capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. In addition, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

As shown, the source device 110 may further be in direct communication with another target electronic device 140 (e.g., cellular telephone, PC, laptop, PDA, pager, etc.) also for the purpose of transmitting and receiving an object or file (e.g., text message, multimedia message, text, audio and/or video file, etc.). As such, the source and target electronic devices 110, 140 may communicate with one another in accordance with, for example, Radio Frequency (RF), Bluetooth (BT), Infrared (IrDA), or any of a number of different wireline or wireless communication techniques, including LAN and/or Wireless LAN techniques.

Figure 2:
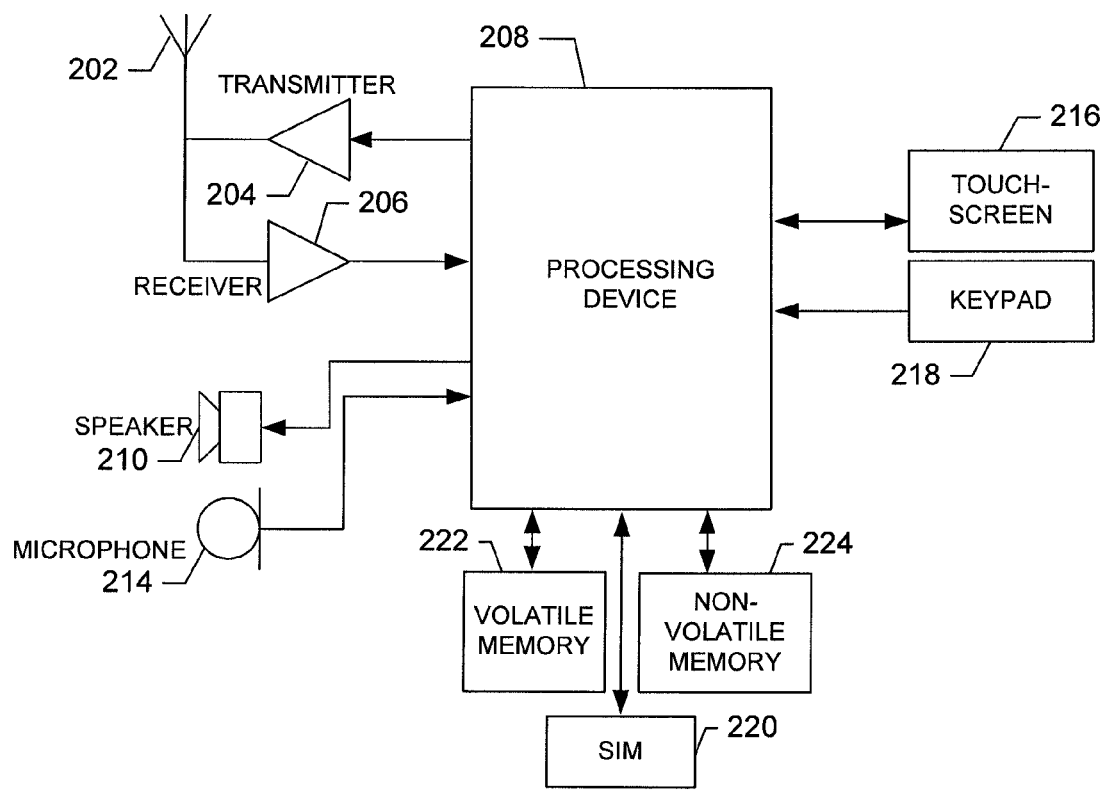
FIG. 2 is a schematic block diagram of a mobile station capable of operating in accordance with an embodiment of the present invention.

Reference is now made to FIG. 2, which illustrates one type of electronic device that would benefit from embodiments of the present invention. As shown, the electronic device (which could be any of the source 110 and/or target 130a, 130b, 140 devices) may be a mobile station, and, in particular, a cellular telephone. It should be understood, however, that the mobile station illustrated and hereinafter described is merely illustrative of one type of electronic device that would benefit from the present invention and, therefore, should not be taken to limit the scope of the present invention. While several embodiments of the mobile station 110 are illustrated and will be hereinafter described for purposes of example, other types of mobile stations, such as personal digital assistants (PDAs), pagers, laptop computers, as well as other types of electronic systems including both mobile, wireless devices and fixed, wireline devices, can readily employ embodiments of the present invention.

The mobile station includes various means for performing one or more functions in accordance with embodiments of the present invention, including those more particularly shown and described herein. It should be understood, however, that the mobile station may include alternative means for performing one or more like functions, without departing from the spirit and scope of the present invention. More particularly, for example, as shown in FIG. 2, in addition to an antenna 202, the mobile station 110 may include a transmitter 204, a receiver 206, and an apparatus that includes means, such as a processing device 208, e.g., a processor, controller or the like, that provides signals to and receives signals from the transmitter 204 and receiver 206, respectively, and that performs the various other functions described below including, for example, the functions relating to transferring different levels of information depending upon a number of tactile inputs received by the mobile station 110.

As discussed in more detail below with regard to FIG. 3, in one embodiment, the processor 308 may be configured to receive a request to transmit an object (e.g., an electronic/virtual business card or "v-card"), wherein the object has one or more items of information (e.g., data fields of the electronic/virtual business card) associated with it. The processor may further be configured to detect one or more tactile inputs on a touchscreen of the mobile station 110, and to determine the number of tactile inputs detected (e.g., the number of fingers the user of the mobile station 110 has placed on the mobile station 110 touchscreen). The processor may then be configured to select at least one of the items of information associated with the object (e.g., the name and phone number data fields of the electronic/virtual business card) based at least in part on the number of tactile inputs detected, and to then transmit the items of information selected.

As one of ordinary skill in the art would recognize, the signals provided to and received from the transmitter 204 and receiver 206, respectively, may include signaling information in accordance with the air interface standard of the applicable cellular system and also user speech and/or user generated data. In this regard, the mobile station can be capable of operating with one or more air interface standards, communication protocols, modulation types, and access types. More particularly, the mobile station can be capable of operating in accordance with any of a number of second-generation (2G), 2.5G and/or third-generation (3G) communication protocols or the like. Further, for example, the mobile station can be capable of operating in accordance with any of a number of different wireless networking techniques, including Bluetooth, IEEE 802.11 WLAN (or Wi-Fi®), IEEE 802.16 WiMAX, ultra wideband (UWB), and the like.

It is understood that the processing device 208, such as a processor, controller or other computing device, may include the circuitry required for implementing the video, audio, and logic functions of the mobile station and may be capable of executing application programs for implementing the functionality discussed herein. For example, the processing device may be comprised of various means including a digital signal processor device, a microprocessor device, and various analog to digital converters, digital to analog converters, and other support circuits. The control and signal processing functions of the mobile device are allocated between these devices according to their respective capabilities. The processing device 208 thus also includes the functionality to convolutionally encode and interleave message and data prior to modulation and transmission. Further, the processing device 208 may include the functionality to operate one or more software applications, which may be stored in memory. For example, the controller may be capable of operating a connectivity program, such as a conventional Web browser. The connectivity program may then allow the mobile station to transmit and receive Web content, such as according to HTTP and/or the Wireless Application Protocol (WAP), for example.

The mobile station may also comprise means such as a user interface including, for example, a conventional earphone or speaker 210, a microphone 214, a touch-sensitive display or touchscreen 216, all of which are coupled to the controller 208. The user input interface, which allows the mobile device to receive data, can comprise any of a number of devices allowing the mobile device to receive data, such as a keypad 218, a touchscreen 216, a microphone 214, or other input device. In embodiments including a keypad, the keypad can include the conventional numeric (0-9) and related keys (#, *), and other keys used for operating the mobile station and may include a full set of alphanumeric keys or set of keys that may be activated to provide a full set of alphanumeric keys. Although not shown, the mobile station may include a battery, such as a vibrating battery pack, for powering the various circuits that are required to operate the mobile station, as well as optionally providing mechanical vibration as a detectable output.

The mobile station can also include means, such as memory including, for example, a subscriber identity module (SIM) 220, a removable user identity module (R-UIM) (not shown), or the like, which typically stores information elements related to a mobile subscriber. In addition to the SIM, the mobile device can include other memory. In this regard, the mobile station can include volatile memory 222, as well as other non-volatile memory 224, which can be embedded and/or may be removable. For example, the other non-volatile memory may be embedded or removable multimedia memory cards (MMCs), secure digital (SD) memory cards, Memory Sticks, EEPROM, flash memory, hard disk, or the like. The memory can store any of a number of pieces or amount of information and data used by the mobile device to implement the functions of the mobile station. For example, the memory can store an identifier, such as an international mobile equipment identification (IMEI) code, international mobile subscriber identification (IMSI) code, mobile device integrated services digital network (MSISDN) code, or the like, capable of uniquely identifying the mobile device. The memory can also store content. The memory may, for example, store computer program code for an application and other computer programs.

For example, in one embodiment of the present invention, the memory may store computer program code for receiving a request to transmit an object (e.g., a digital picture or image), wherein the object has one or more items of information (e.g., one or more groups of pixels of the digital image) associated with it. The memory may further store computer program code for detecting one or more tactile inputs on the touchscreen 216 of the mobile station 110 and determining the number of tactile inputs detected (e.g., the number of fingers the user of the mobile station 110 has placed on the mobile station 110 touchscreen 216). The memory may store computer program code for selecting at least one of the items of information associated with the object (e.g., one or more of the groups of pixels) based at least in part on the number of tactile inputs detected, and then transmitting the items of information selected.

The apparatus, method and computer program product of embodiments of the present invention are primarily described in conjunction with mobile communications applications. It should be understood, however, that the apparatus, method and computer program product of embodiments of the present invention can be utilized in conjunction with a variety of other applications, both in the mobile communications industries and outside of the mobile communications industries. For example, the apparatus, method and computer program product of embodiments of the present invention can be utilized in conjunction with wireline and/or wireless network (e.g., Internet) applications.

Method of Transferring Different Levels of Information

Figure 3:
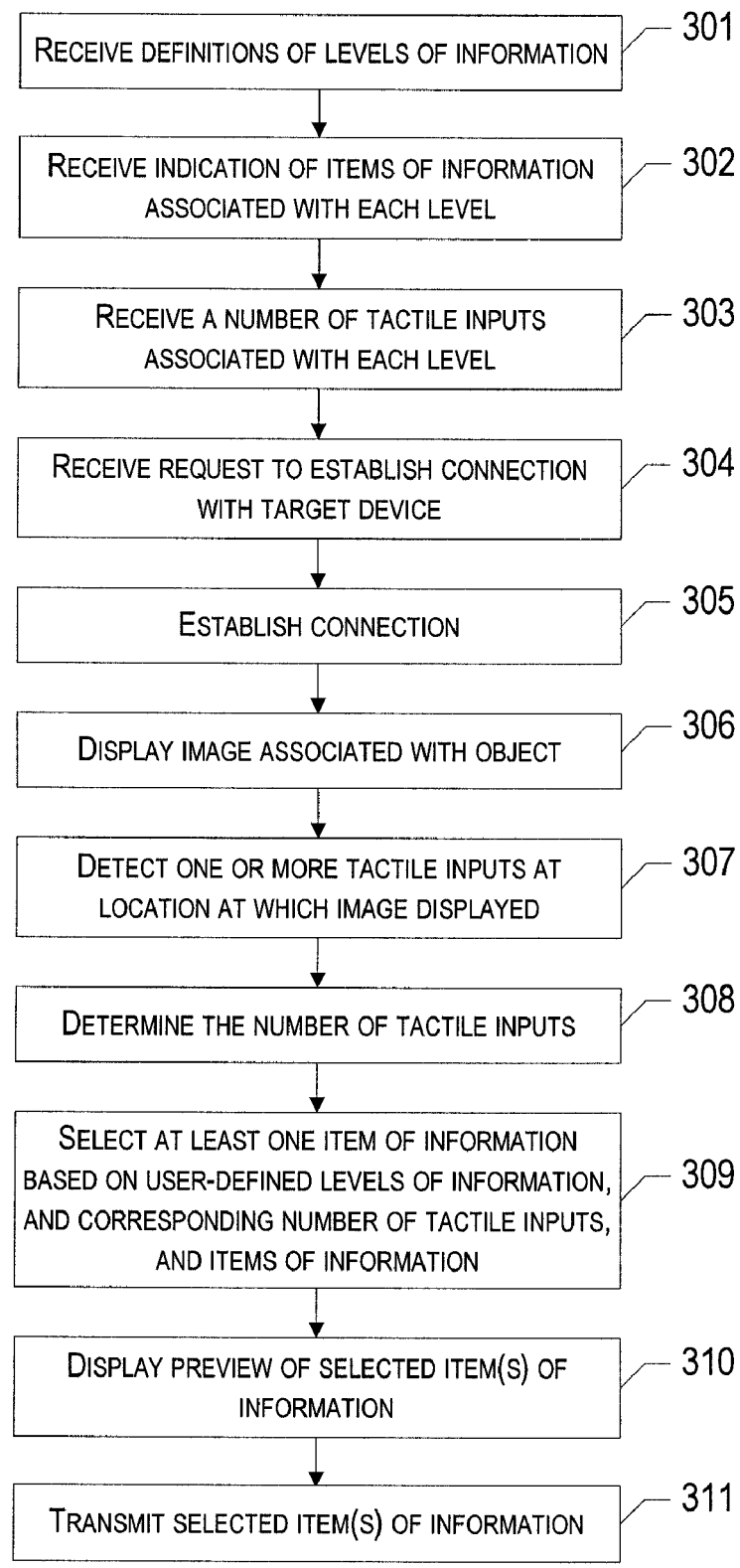
FIG. 3 is a flow chart illustrating the process of transferring different levels of information depending upon a number of tactile inputs in accordance with embodiments of the present invention.

Referring now to FIG. 3, the operations are illustrated that may be taken in order to quickly and easily differentiate between different levels of information when transmitting objects or files from one electronic device to another. As shown, the process may begin at Block 301, when the electronic device, and in particular, the processor or similar means operating on the electronic device, receives a definition of various levels into which the user of the electronic device would like to divide the items of information included in the objects or files stored on the user's electronic device. These levels may include, for example, various levels of privacy associated with the information of the objects or files (e.g., public, semi-public, semi-private, and private). Alternatively, or in addition, these levels may correspond to different levels of detail of an object or file that the user may wish to transmit (e.g., low resolution, medium resolution and high resolution). As one of ordinary skill in the art will recognize any number of levels may exist for categorizing information in any number of different manners without departing from the spirit and scope of embodiments of the present invention.

The electronic device (e.g., the processor or similar means operating on the electronic device) may thereafter, at Block 302, receive an indication of the items of information the user would like to associate with each of the levels of information defined by the user at Block 301. For example, where the user has defined levels of privacy including, for example, public, semi-public, semi-private and private, he or she may like to categorize different items of information (i.e., data fields) contained in the user's electronic/virtual business card stored in memory on the electronic device into these four levels. The items of information (i.e., data fields) may include, for example, the user's name, address, phone number, and/or email address, images of the user, his or children and/or spouse, or the like. The user may indicate to the electronic device that the user's name and email address should be categorized as public; his or her address and phone number should be categorized as semi-public; his or her image as semi-private; and images of his or her children and spouse as private. As is described in more detail below, when a user wishes to transmit items of information associated with one level of privacy, he or she may also automatically transmit all items of information associated with the lower levels of privacy. As a result, each level of privacy, in essence, may include all items of information associated with its level of privacy, as well as those associated with the lower levels of privacy.

As another example, where the object at issue is a digital video, which can be divided into successive frames including intra coded frames ("I-frames"), predictive coded frames ("P-frames") and bidirectionally predictive coded frames ("B-frames"), and the levels of information defined are associated with a level of detail and include, for example, low resolution, medium resolution and high resolution, the user may indicate to the electronic device at Block 302, that the I-frames of the digital video are associated with the first level of detail (e.g., low resolution); the P-frames with the second (e.g., medium resolution); and the B-frames with the third level of detail (e.g., high resolution). As above and as is described in more detail below, when a user wishes to transmit items of information associated with one level of detail, he or she may also automatically transmit all items of information associated with the lower levels of detail. As a result, each level of detail, in essence, may include all items of information associated with its level of detail, as well as those associated with the lower levels of detail.

The electronic device (e.g., the processor or similar means operating on the electronic device) may further receive, at Block 303, an indication of a number of tactile inputs associated with each defined level. In other words, the user may indicate to the electronic device the number of fingers, pens, styluses, or other selection objects, that need to be touching the electronic device touchscreen in order for the items of information corresponding to each defined level of information to be transmitted. For example, the user may indicate (and, thereby, the processor or similar means operating on the electronic device may receive an indication) that one tactile input corresponds to public information; two tactile inputs correspond to semi-public; three to semi-private; and four to private. As is discussed in more detail below, based on this indication, when a user touches the electronic device touchscreen with two fingers (or other selection objects) the electronic device (e.g., processor or similar means) may transmit semi-public, as well as public, information, but not transmit semi-private or private information. Similarly, the user may indicate that one tactile input corresponds to low resolution; two tactile inputs correspond to medium resolution; and three tactile inputs correspond to high resolution. This similarly may result in the electronic device (e.g., processor or similar means) transmitting only I- and P-frames (and not B-frames) of a digital video when two fingers (or other selection objects) are used to touch the electronic device touchscreen in association with transmittal of the digital video.

Once the above levels of information and their corresponding items of information and number of tactile inputs have been defined, a user may be able to quickly and easily transmit different levels of information to other electronic devices. In particular, at Block 304, the electronic device (referred to hereinafter as the "source device"), and in particular a processor or similar means operating on the source device, may receive a request to establish a connection with another electronic device (referred to hereinafter as the "target device") and, at Block 305, establish the requested connection. In one embodiment, the foregoing may involve identifying one or more electronic devices within proximity of the source device and establishing a connection (e.g., using RF, BT or IrDA) with a selected one of the devices within proximity. Alternatively, as discussed above with regard to FIG. 1, this may involve establishing a connection with an identified target device via any wired or wireless communication network such as a PAN, MAN, LAN, WAN, or the like, regardless of the location of the devices.

Once the connection has been established, the electronic device (e.g., processor or similar means operating on the electronic device) may receive a request to transmit an object or file to the target device. In one embodiment this may involve displaying an image associated with the object or file (Block 306) and detecting one or more tactile inputs on the electronic device touchscreen proximate the location at which the image is displayed (Block 307). In one embodiment, displaying the image associated with the object or file may include displaying a thumbnail or icon associated with the object or file. Alternatively, displaying the image may include displaying the contents of the object or file itself. For example, where the object or file comprises an electronic/virtual business card, displaying an image associated with the object or file may involve displaying the data fields, or items of information, of the electronic/virtual business card itself. In the latter instance, detecting one or more tactile inputs proximate the location at which the image is displayed may involve detecting one or more tactile inputs anywhere on the electronic device touchscreen.

In one embodiment, the one or more tactile inputs may be detected at or about the same time. In other words, in order to select the object or file, the user may apply pressure to the electronic device touchscreen using one or more fingers (or other selection objects) at the same time. Alternatively, detecting one or more tactile inputs may involve detecting a sequence of one or more tactile inputs occurring at or around the same location within some predefined period of time. In other words, according to this embodiment, the user may tap his or her finger (or other selection object) on the electronic device touchscreen a certain number of times in order to select the object or file.

Figure 4:
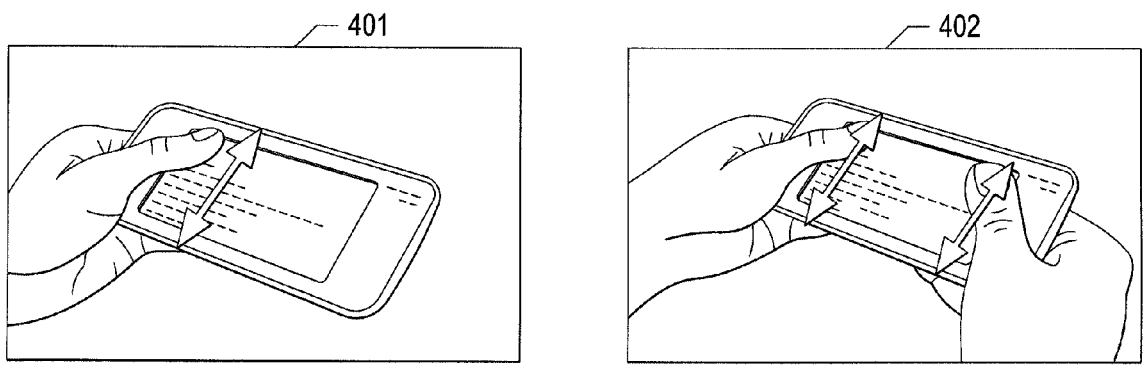
FIG. 4 illustrates different techniques for transmitting different levels of information in accordance with one embodiment of the present invention.

To illustrate one embodiment of the present invention, reference is made to FIG. 4, which provides two examples of a manner in which a user may hold an electronic device, and thereby touch the electronic device touchscreen, in order to transmit different levels of information. As shown in 401, when a user wishes to transmit one level of information (e.g., only public information of a v-card, only the I-frames of a digital video, etc.), the user may hold the electronic device using one hand, causing only one finger to touch the electronic device touchscreen (i.e., one tactile input). Alternatively, as shown in 402, when the user wishes to transmit another level of information (e.g., semi-public and public information of a v-card, I- and P-frames of a digital video, etc.), the user may hold the electronic device using both hands, causing two fingers to touch the electronic device (i.e., two tactile inputs). While not shown, the user could further place additional fingers of the left and/or right hand on the electronic device touchscreen in order to transmit additional levels of information (e.g., semi-private and/or private information of a v-card, I-, P- and B-frames of a digital video, etc.). Alternatively, or in addition, the user may tap one or more of his fingers a certain number of times within a predefined period of time.

The electronic device (e.g., the processor or similar means operating on the electronic device) may detect the tactile input(s) and determine their locations via any number of techniques that are known to those of ordinary skill in the art. For example, the touchscreen may comprise two layers that are held apart by spacers and have an electrical current running therebetween. When a user touches the touchscreen, the two layers may make contact causing a change in the electrical current at the point of contact. The electronic device may note the change of the electrical current, as well as the coordinates of the point of contact. Alternatively, wherein the touchscreen uses a capacitive, as opposed to a resistive, system to detect tactile input, the touchscreen may comprise a layer storing electrical charge. When a user touches the touchscreen, some of the charge from that layer is transferred to the user causing the charge on the capacitive layer to decrease. Circuits may be located at each corner of the touchscreen that measure the decrease in charge, such that the exact location of the tactile input can be calculated based on the relative differences in charge measured at each corner. Embodiments of the present invention can employ other types of touchscreens, such as a touchscreen that is configured to enable touch recognition by any of resistive, capacitive, infrared, strain gauge, surface wave, optical imaging, dispersive signal technology, acoustic pulse recognition or other techniques, and to then provide signals indicative of the location of the touch.

The touchscreen interface may be configured to receive an indication of an input in the form of a touch event at the touch screen display. As suggested above, the touch event may be defined as an actual physical contact between a selection object (e.g., a finger, stylus, pen, pencil, or other pointing device) and the touchscreen display. Alternatively, a touch event may be defined as bringing the selection object in proximity to the touchscreen display (e.g., hovering over an object or approaching an object within a predefined distance).

Upon detecting the one or more tactile inputs (occurring simultaneously or in sequence), the electronic device (e.g., the processor or similar means operating on the electronic device) may determine the number of tactile inputs detected (Block 308), and then use this information and the information received at Blocks 301 through 303 to select the items of information associated with the object or file to be transmitted to the target device (Block 309). As noted above, in one embodiment, this may involve determining not only the items of information corresponding to the level of information indicated by the number of tactile inputs detected, but also the items of information corresponding to any lower levels of information.

For example, if the electronic device (e.g., processor or similar means) determines that the user placed two fingers (or other selection devices) on the touchscreen (or tapped his finger twice within a predefined period of time) in association with the transmittal of an electronic/virtual business card, the electronic device (e.g., processor or similar means) may determine, based on information received at Blocks 301 and 303, that the user wishes to transmit information corresponding to the level defined "semi-public." Then using the information received at Block 302, the electronic device (e.g., processor or similar means) may select the data fields of the electronic/virtual business card associated with the user's name, email address, address and phone number. In other words, in one embodiment, the electronic device (e.g., processor or similar means) may select all items of information associated with the object or file that correspond not only to the semi-public level of privacy, but also the lower, public level of privacy.

As another example, if the electronic device (e.g., processor or similar means operating on the electronic device) detected three tactile inputs in association with the transmittal of a digital video, the electronic device may determine, based on the information received at Blocks 301 and 303, that the user is interested in transmitting items of information corresponding to the level defined "high resolution." Using the information received at Block 302, the electronic device (e.g., processor or similar means) may then select all I-, P- and B-frames of the digital video (i.e., all items of information corresponding to the high resolution level of detail (i.e., B-frames), as well as all items of information corresponding to the lower, medium (i.e., P-frames) and low (i.e., I-frames) resolution levels of detail).

As one of ordinary skill in the art will recognize, the foregoing examples of how an object or file may be divided into various levels and subsequently selected based on the number of tactile inputs detected are provided for exemplary purposes only. As noted above, any number of levels may exist for categorizing information in any number of different manners without departing from the spirit and scope of embodiments of the present invention. For example, a different level may be associated with the amount of processing performed on a digital image (e.g., an image having blurred faces may correspond to a first level, while an image where the faces are no longer blurred may correspond to a second level). As another example, while one level associated with an object or file, such as a digital image, may include location information in the form of metadata displayed on the image, another level may not. These and other similar examples do not depart from the spirit and scope of embodiments of the present invention and should, therefore, be considered to be included in embodiments of the present invention.

Once the items of information have been selected, in one embodiment, the electronic device and, in particular, the processor or similar means operating on the electronic device, may display, at Block 310, a preview of the items of information associated with the level of information indicated by the user and, thereby, the items of information to be transmitted to the target device. As noted above, in one embodiment, displaying an image associated with the object or file may involve displaying the contents of the object or file itself. For example, displaying an image may involve displaying the data fields of the electronic/virtual business card. In this embodiment, in order to display a preview of the items of information selected, the electronic device (e.g., processor or similar means operating on the electronic device) may highlight the selected items of information or data fields with respect to the remaining items of information or data fields displayed. For example, to continue with the example above wherein the user used two fingers (or other selection objects) in association with the electronic/virtual business card, the electronic device may change the color of, bold, underline, or otherwise accentuate the user's name, address, email address and phone number of his or her electronic/virtual business card, while leaving the remaining data fields (e.g., his or her image, an image of his or her children and/or spouse, etc.) in the normal size, text and color.

Alternatively, where, for example, displaying the image associated with the object or file involves, instead, displaying a thumbnail or icon associated with the object or file, displaying the preview of the items of information may involve displaying a pop-up window identifying the selected level of information and/or the corresponding items of information. For example, to continue with the example above wherein the user used three fingers (or other selection devices) in association with the digital video, the electronic device (e.g., processor or similar means) may display a pop-up window that reads "High Resolution" and/or "I-, P- and B-frames." As one of ordinary skill in the art will recognize, the foregoing merely provides examples of how the electronic device (e.g., processor or similar means operating on the electronic device) may indicate to the user the level of information he or she has selected and/or the items of information he or she is about to transmit. Other similar techniques may likewise be used without departing from the spirits and scope of embodiments of the present invention.

Finally, assuming that the user does not object to the items of information selected and previewed at Blocks 309 and 310, respectively, the electronic device and, in particular, the processor or similar means operating on the electronic device, may, at Block 311, transmit the selected items of information to the target device via a wired or wireless communication channel.

While the foregoing description assumes that the user wishes to transmit the selected object or file (and, in particular, specific items of information of the object or file) to another electronic device, embodiments of the present invention are not so limited. As one of ordinary skill in the art will recognize, other, similar, actions may likewise be requested and taken in association with the object or file without departing from the spirit and scope of embodiments of the present invention. As an example, user may wish to save an object or file and, in particular, specific items of information of the object or file, to a disk or to a specific location in memory. According to embodiments of the present invention, the user may do so by selecting the object or file using a number of fingers (or other selection objects) corresponding to the level of information the user desires to save.

CONCLUSION

As described above and as will be appreciated by one skilled in the art, embodiments of the present invention may be configured as an apparatus and method. Accordingly, embodiments of the present invention may be comprised of various means including entirely of hardware, entirely of software, or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Embodiments of the present invention have been described above with reference to block diagrams and flowchart illustrations of methods, apparatuses (i.e., systems) and computer program products. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus, such as processor 208 discussed above with reference to FIG. 2, to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus (e.g., processor 208 of FIG. 2) to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
    at least one processor; and
    at least one memory including computer program code, the at least one memory and the computer program code configured to, with the at least one processor, cause the apparatus to perform at least the following:
        receive a request associated with an object comprising one or more items of information;
        provide for detection of one or more tactile inputs on a touchscreen;

determine the number of tactile inputs detected; and
select at least one of the one or more items of information associated with the object based at least in part on the number of tactile inputs detected.

2. The apparatus of claim 1, wherein the request comprises a request to provide for transmission of the object, wherein the at least one memory and the computer program code are further configured to, with the at least one processor, cause the apparatus to:
provide for transmission of the at least one item of information selected.

3. The apparatus of claim 2, wherein the at least one memory and the computer program code are further configured to, with the at least one processor, cause the apparatus to:
cause display of a preview of the at least one item of information selected prior to providing for transmission of the at least one item of information.

4. The apparatus of claim 3, wherein in order to cause display of an image associated with an object, the at least one memory and the computer program code are further configured to, with the at least one processor, cause the apparatus to cause display of the one or more items of information associated with the object, and wherein in order to cause display of a preview of the at least one item of information selected, the at least one memory and the computer program code are further configured to, with the at least one processor, cause the apparatus to highlight the at least one item of information selected with respect to the remaining items of information displayed.

5. The apparatus of claim 3, wherein in order to cause display of a preview of the at least one item of information selected, the at least one memory and the computer program code are further configured to, with the at least one processor, cause the apparatus to cause display of a pop-up window identifying the at least one item of information selected.

6. The apparatus of claim 1, wherein the at least one memory and the computer program code are is further configured to, with the at least one processor, cause the apparatus to:
cause display of an image associated with the object at a location on the touchscreen, wherein the one or more tactile inputs are detected proximate the location.

7. The apparatus of claim 1, wherein the at least one memory and the computer program code are is further configured to, with the at least one processor, cause the apparatus to:
receive a definition of one or more levels of information;
receive an indication of a number of tactile inputs associated with respective levels of information; and
receive an indication of one or more of the items of information associated with the object corresponding to respective levels of information, such that in order to select at least one of the one or more items of information associated with the object, the at least one memory and the computer program code are further configured to, with the at least one processor, cause the apparatus to select the at least one item of information based at least in part on the indications received.

8. The apparatus of claim 7, wherein the object comprises an electronic business card, the one or more items of information associated with the object comprise one or more data fields of the electronic business card, and the one or more levels of information correspond to one or more levels of privacy.

9. The apparatus of claim 7, wherein the object comprises a digital video, the one or more items of information associated with the object comprise one or more groups of frames of the digital video, and wherein the one or more levels of information correspond to one or more levels of detail.

10. A method comprising:
receiving a request associated with an object comprising one or more items of information;
providing for detection of one or more tactile inputs on a touchscreen;
determining the number of tactile inputs detected; and
selecting at least one of the one or more items of information associated with the object based at least in part on the number of tactile inputs detected.

11. The method of claim 10, wherein the request comprises a request to provide for transmission of the object, said method further comprising:
providing for transmission of the at least one item of information selected.

12. The method of claim 11 further comprising:
causing display of a preview of the at least one item of information selected prior to providing for transmission of the at least one item of information.

13. The method of claim 12, wherein causing display of an image associated with an object further comprises causing display of the one or more items of information associated with the object, and wherein causing display of a preview of the at least one item of information selected further comprises highlighting the at least one item of information selected with respect to the remaining items of information displayed.

14. The method of claim 12, wherein causing display of a preview of the at least one item of information selected further comprises causing display of a pop-up window identifying the at least one item of information selected.

15. The method of claim 10 further comprising:
causing display of an image associated with the object at a location on the touchscreen, wherein the one or more tactile inputs are detected proximate the location.

16. The method of claim 10 further comprising:
receiving a definition of one or more levels of information;
receiving an indication of a number of tactile inputs associated with respective levels of information; and
receiving an indication of one or more of the items of information associated with the object corresponding to respective levels of information, wherein selecting at least one of the one or more items of information associated with the object, further comprises selecting the at least one item of information based at least in part on the indications received.

17. The method of claim 16, wherein the object comprises an electronic business card, the one or more items of information associated with the object comprise one or more data fields of the electronic business card, and the one or more levels of information correspond to one or more levels of privacy.

18. The method of claim 16, wherein the object comprises a digital video, the one or more items of information associated with the object comprise one or more groups of frames of the digital video, and wherein the one or more levels of information correspond to one or more levels of detail.

19. A computer program product comprising at least one tangible computer-readable storage medium having computer-readable program code portions stored therein, the computer-readable program code portions comprising:
a first executable portion for receiving a request associated with an object comprising one or more items of information;
a second executable portion for providing for detection of one or more tactile inputs on a touchscreen;

a third executable portion for determining the number of tactile inputs detected; and a fourth executable portion for selecting at least one of the one or more items of information associated with the object based at least in part on the number of tactile inputs detected.

20. The computer program product of claim 19, wherein the request comprises a request to provide for transmission of the object, said computer-readable program code portions further comprising:

a fifth executable portion for providing for transmission of the at least one item of information selected.

21. The computer program product of claim 20, wherein the computer-readable program code portions further comprise:

a sixth executable portion for causing display of a preview of the at least one item of information selected prior to providing for transmission of the at least one item of information.

22. The computer program product of claim 21, wherein the first executable portion is configured to cause display of the one or more items of information associated with the object, and wherein the sixth executable portion is configured to highlight the at least one item of information selected with respect to the remaining items of information displayed.

23. The computer program product of claim 21, wherein the sixth executable portion is configured to cause display of display a pop-up window identifying the at least one item of information selected.

24. The computer program product of claim 19, wherein the computer-readable program code portions further comprise:

a fifth executable portion for receiving a definition of one or more levels of information;

a sixth executable portion for receiving an indication of a number of tactile inputs associated with respective levels of information; and a seventh executable portion for receiving an indication of one or more of the items of information associated with the object corresponding to respective levels of information, wherein selecting at least one of the one or more items of information associated with the object further comprises selecting the at least one item of information based at least in part on the indications received.

25. An apparatus comprising:

means for receiving a request associated with an object comprising one or more items of information;

means for providing for detection of one or more tactile inputs proximate the location;

means for determining the number of tactile inputs detected; and means for selecting at least one of the one or more items of information associated with the object based at least in part on the number of tactile inputs detected.

* * * * *

UNITED STATES PATENT AND TRADEMARK OFFICE
CERTIFICATE OF CORRECTION

| | | |
|---|---|---|
| PATENT NO. | : 8,077,156 B2 | |
| APPLICATION NO. | : 11/955807 | |
| DATED | : December 13, 2011 | |
| INVENTOR(S) | : Mizutani et al. | |

It is certified that error appears in the above-identified patent and that said Letters Patent is hereby corrected as shown below:

<u>Column 15,</u>
Line 27, "display a pop-up window" should read --a pop-up window--.

Signed and Sealed this
Thirteenth Day of November, 2012

David J. Kappos
*Director of the United States Patent and Trademark Office*